United States Patent
Smith et al.

(10) Patent No.: US 11,818,584 B2
(45) Date of Patent: *Nov. 14, 2023

(54) TWO-PHASE DISCOVERY AND ONBOARDING OF INTERNET OF THINGS (IOT) DEVICES

(71) Applicant: Intel Corporation, Santa Clara, CA (US)

(72) Inventors: Ned M. Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,044

(22) Filed: Nov. 19, 2021

(65) Prior Publication Data

US 2022/0191702 A1    Jun. 16, 2022

Related U.S. Application Data

(63) Continuation of application No. 16/608,788, filed as application No. PCT/US2017/031747 on May 9, 2017, now Pat. No. 11,184,774.

(51) Int. Cl.
*H04W 12/75* (2021.01)
*H04W 76/10* (2018.01)
(Continued)

(52) U.S. Cl.
CPC ........... *H04W 12/75* (2021.01); *H04W 12/02* (2013.01); *H04W 12/0471* (2021.01);
(Continued)

(58) Field of Classification Search
CPC ... H04W 12/75; H04W 12/02; H04W 12/009; H04W 12/06; H04W 76/10; H04W 12/50;
(Continued)

(56) References Cited

U.S. PATENT DOCUMENTS 8,769,643 B1 * 7/2014 Ben Ayed ............... G06F 21/43
                                                              726/5
10,104,525 B1  10/2018 Kaiser et al.
(Continued)

FOREIGN PATENT DOCUMENTS

WO    2017065948    4/2017
WO    2018208289    11/2018

OTHER PUBLICATIONS

"International Application Serial No. PCT US2017 031747, International Search Report dated Aug. 8, 2017", 4 pgs.
(Continued)

*Primary Examiner* — Mohammad A Siddiqi
(74) *Attorney, Agent, or Firm* — Schwegman Lundberg & Woessner, P.A.

(57) ABSTRACT

Various systems and methods for discovery and onboarding in an interconnected network framework of Internet of Things (IoT) devices are described. In an example, a technique for onboarding and provisioning a device onto an interconnected network framework includes operations to: receive a unique temporary device identifier from a device instance, the device instance indicating availability for onboarding onto a network; onboard the device instance onto the network; establish a secure session with the device instance via the network; receive, in the secure session, a secure device identifier; and initiate provisioning of the device instance in a secure directory based on the secure device identifier. In a further example, techniques are provided to securely identify and provision a second device instance (a doppelganger device instance) operating on a physical device that hosts both the first device instance and the second device instance.

24 Claims, 10 Drawing Sheets

(51) Int. Cl.
*H04W 12/02* (2009.01)
*H04W 12/06* (2021.01)
*H04W 12/71* (2021.01)
*H04W 12/0471* (2021.01)

(52) U.S. Cl.
CPC .......... *H04W 12/06* (2013.01); *H04W 12/71* (2021.01); *H04W 76/10* (2018.02); *G06Q 2220/00* (2013.01)

(58) Field of Classification Search
CPC ... H04W 12/0471; H04W 12/71; H04W 4/70; H04W 12/04; H04W 12/108; H04W 84/18; H04L 9/0894; H04L 209/80; G06Q 2220/00
See application file for complete search history.

(56) References Cited

U.S. PATENT DOCUMENTS

| | | | |
|---|---|---|---|
| 10,880,743 B1 | 12/2020 | Berzin et al. | |
| 11,184,774 B2* | 11/2021 | Smith | H04L 9/0894 |
| 2009/0019801 A1* | 1/2009 | Coghlan | B41M 3/06 |
| | | | 52/311.1 |
| 2012/0047501 A1* | 2/2012 | Box | G06F 9/45533 |
| | | | 718/1 |
| 2016/0259941 A1* | 9/2016 | Vasudevan | H04L 63/20 |
| 2016/0308861 A1* | 10/2016 | Ameling | H04L 63/0876 |
| 2016/0364553 A1* | 12/2016 | Smith | H04L 63/10 |
| 2016/0366157 A1 | 12/2016 | Smith et al. | |
| 2017/0005820 A1* | 1/2017 | Zimmerman | H04L 67/10 |
| 2018/0173702 A1* | 6/2018 | Said | G06Q 10/067 |
| 2018/0189344 A1* | 7/2018 | Akwule | G06F 16/951 |
| 2019/0248378 A1* | 8/2019 | Nix | B60K 35/00 |
| 2019/0303938 A1* | 10/2019 | Sanchez-Llorens | |
| | | | G06Q 20/405 |
| 2020/0177678 A1 | 6/2020 | Livanos et al. | |
| 2020/0186998 A1 | 6/2020 | Smith et al. | |
| 2022/0191702 A1* | 6/2022 | Smith | H04W 12/75 |

OTHER PUBLICATIONS

"International Application Serial No. PCT US2017 031747, Written Opinion dated Aug. 8, 2017", 7 pgs.

"U.S. Appl. No. 16/608,788, Preliminary Amendment filed Oct. 25, 2019", 10 pgs.

"International Application Serial No. PCT US2017 031747, International Preliminary Report on Patentability dated Nov. 21, 2019", 9 pgs.

"U.S. Appl. No. 16/608,788, Notice of Allowance dated Jul. 21, 2021", 24 pgs.

Oscar, Garcia-Morchon, "Security Considerations in the IP-based Internet of Things", [Online] Retrieved from the internet:https: tools.ietf.org pdf draft-garcia-core-security-06.pdf, (Sep. 11, 2013), 109 pgs.

* cited by examiner

US 11,818,584 B2

TWO-PHASE DISCOVERY AND ONBOARDING OF INTERNET OF THINGS (IOT) DEVICES

PRIORITY APPLICATION

This application is a continuation of U.S. application Ser. No. 16/608,788, filed Oct. 25, 2019, which is a U.S. National Stage Application under 35 U.S.C. 371 from International Application No. PCT/US2017/031747, filed May 9, 2017, published as WO 2018/208289, all of which are incorporated herein by reference in their entirety.

TECHNICAL FIELD

Embodiments described herein generally relate to processing techniques used with data communications and interconnected device networks, and in particular, to network connection techniques applied within internet of things (IoT) devices and device networks.

BACKGROUND

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
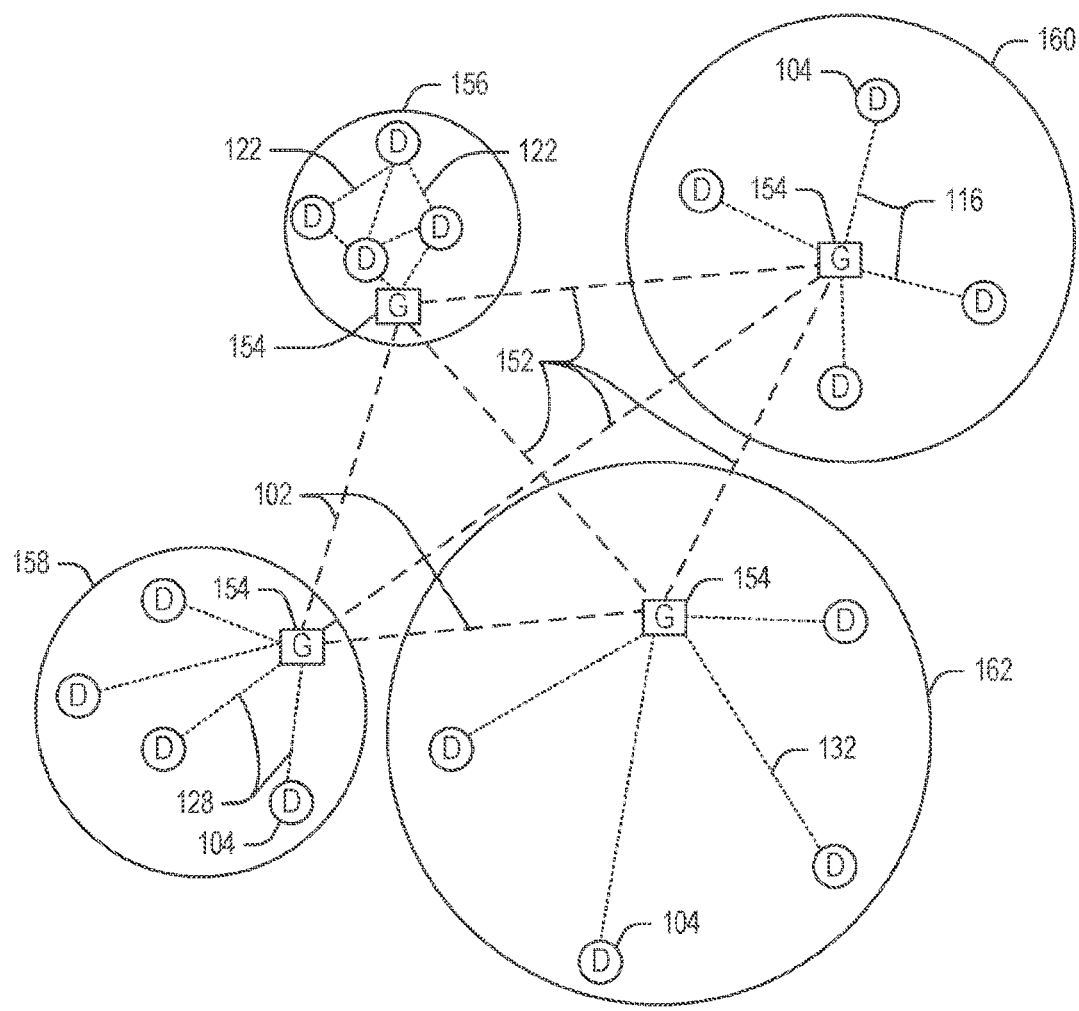
FIG. 1 illustrates an domain topology for respective internet-of-things (IoT) networks coupled through links to respective gateways, according to an example.

In the following description, methods, configurations, and related apparatus configurations are disclosed for IoT discovery and onboarding procedures. As discussed in the following examples, techniques for communicating with multi-framework devices are provided, including the use of an onboarding technique without the disclosure of a framework-independent unique identifier. With one example technique, a logical device is provided with respective device identities for discovery, onboarding, and establishing a secure session. With another example technique, a two-step onboarding process is used to automatically pre-onboard a device that includes multiple identities. Accordingly, this technique provides significant advantages for IoT communication frameworks that may involve many variations of onboarding.

IoT systems are a network of distributed data producers and consumers. Various types of IoT frameworks (e.g., Open Connectivity Foundation (OCF), Open Mobile Alliance (OMA), OMA Lightweight M2M (LWM2M), OneM2M, Alljoyn, and the like) have been developed to define communication schemes between such IoT frameworks. The proliferation of IoT frameworks has compelled vendors of IoT devices to create devices that support multiple frameworks. Each framework has a device lifecycle model that needs to be adhered to in order for the physical device to be discovered and made operational within its respective realms.

Control of IoT networks is facilitated by user and cloud applications that also support multiple IoT frameworks. In an environment such as this, a control console may enumerate devices appearing in multiple IoT realms, for example to allow the user to perform lifecycle operations such as onboarding or construction of a palette of devices used by a network configuration tool (e.g., a configuration tool such as Node Red.)

One significant problem facing multi-framework environments is that multi-framework devices may appear as distinct devices in their respective palette but in reality are a single physical device. A common disambiguation workaround is to assign a common device identifier spanning the plurality of frameworks hosted by the same physical platform. However, some framework architectures include anti-tracking requirements that discourage use of a framework independent unique identifier (e.g., an identifier that an independent observer could use to track device interactions across different applications and networks). This creates a particular challenge because discovery is often the first point in a device lifecycle where trackable identifiers may be publicly disclosed.

The techniques discussed herein include a method for discovering multi-framework devices, and onboarding such devices with disambiguation that does not involve the use of a traceable identifier. As outlined in the following techniques, each logical device may use up to three device identities: the first identity is a non-unique identity, that is presented when the device wishes to be discovered for onboarding; the second identity is presented after a secure session is established between the new device and the onboarding tool and uniquely identifies the device to authenticated callers within the same framework context; and finally, a third identity is revealed if there is one or more peer frameworks hosted by the physical device. The second value is a true identifier value, a unique identifier that is used to identify the device to other devices in its peer network.

The techniques discussed herein further include an onboarding technique (e.g., embodied in an onboarding tool, service, or device) providing a two-step onboarding process where devices available for onboarding are automatically pre-onboarded. These devices are pre-onboarded but hidden from view of administrators or palettes that seek to present a consistent user experience (such as where the presentation of multiple logical devices for a single physical device, referred to herein as "doppelganger" devices, would be confusing to users). As further discussed herein, these discovery and onboarding techniques may be provided in a variety of IoT network configurations and domain types, including settings where doppelganger devices do or do not exist.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
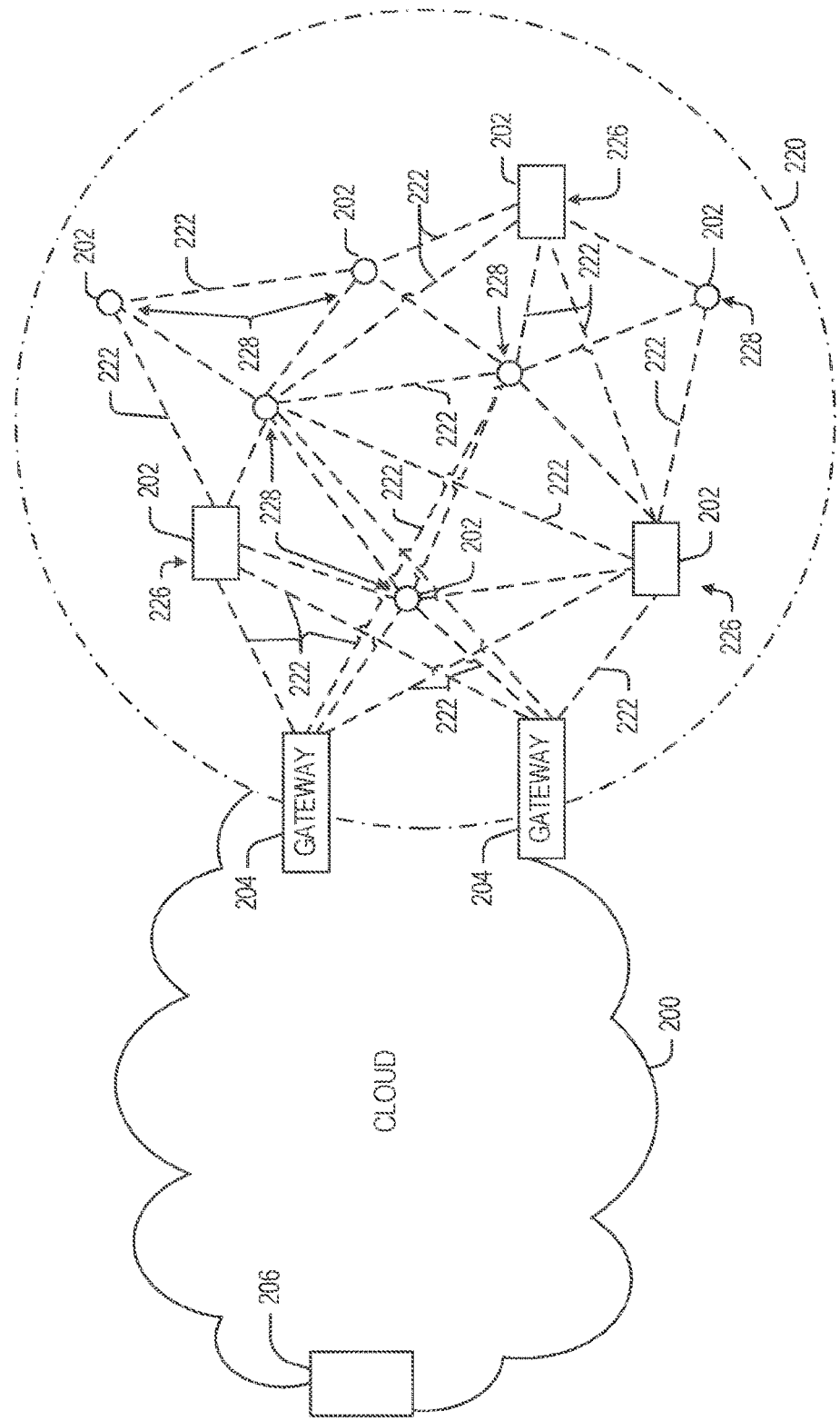
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

As previously suggested, communications among IoT devices and within IoT networks (including in the scenarios depicted above for FIGS. 1 and 2) are often dependent on successful procedures for identifying, onboarding, and integrating the device into a network architecture. Existing approaches for onboarding and device discovery often involve a protocol independent identifier (PIID) that is supplied to each framework hosted by the physical device. Observers of the PIID may correlate the various framework instances and filter doppelganger devices (e.g., multiple logical devices for a single physical device) for the purposes of onboarding or construction of a device palate. In many scenarios, the PIID is observable by non-participants because discovery occurs over a clear, publicly accessible (non-encrypted) channel. Therefore, this identifier could be skimmed and used to index a database of transactions across all frameworks, leading to privacy concerns.

The present techniques, further discussed herein, enable an onboarding technique without the use of a PIID or an equivalent publicly trackable identifier. These techniques may still enable intuitive user interface behavior where doppelganger device representations are filtered from user view. Accordingly, with these techniques, framework privacy requirements may be achieved without introduction of a master identifier that could be used for anti-privacy tracking.

Figure 3:
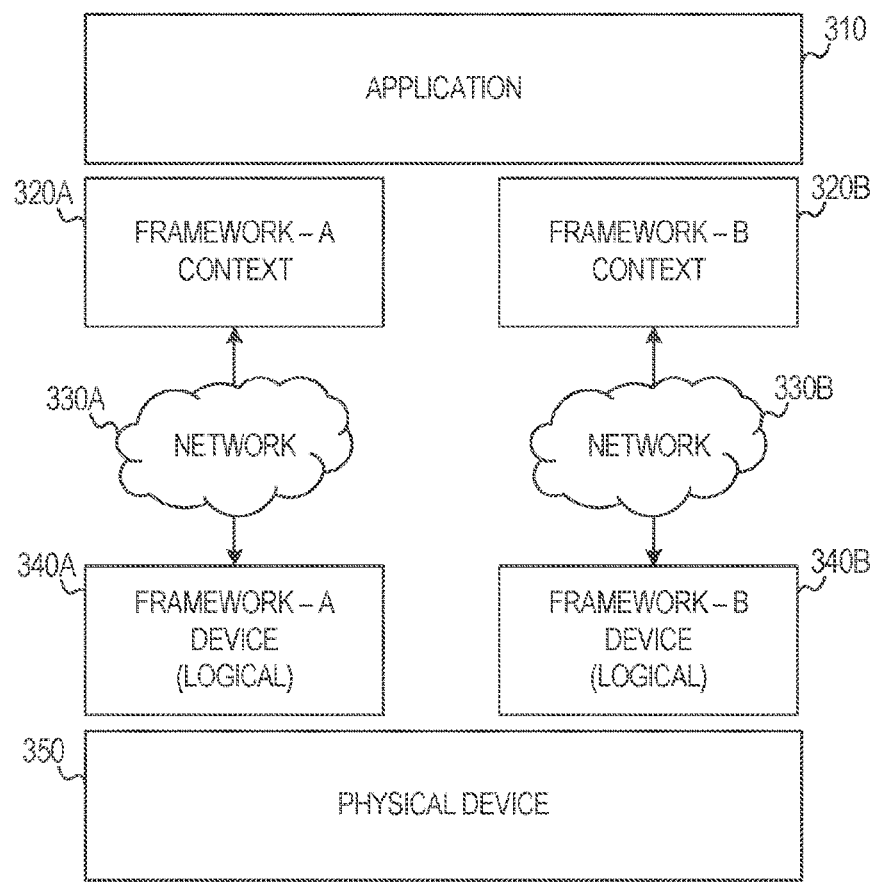
FIG. 3 illustrates a block diagram of communication frameworks used with a physical device to establish communications within a network framework of IoT devices, according to an example.

FIG. 3 illustrates a block diagram of communication frameworks used with an example physical device 350 to establish communications within a network framework of IoT devices. As shown, a physical device 350 may include multiple framework stacks (e.g., communication stacks) used to separately communicate among different network contexts.

With the physical device 350, a first framework (Framework A) 320A provides a logical device representation 340A communicating over a first network 330A to expose a first context to an application 310. Concurrently with the physical device 350, a second framework (Framework B) 320B provides a logical device representation 340B communicating over a second network 330B to expose a second context to the application 310. Thus, these two different logical devices 340A, 340B may be considered as doppelganger devices. The techniques described herein may be used for onboarding the different logical devices 340A, 340B without requiring a trackable identifier for the physical device 350 to be advertised publicly.

In an example applicable to a deployment in an OCF network framework, a "device" may be represented as a logical entity where a platform (physical device) may host multiple logical devices. Each device instance may separately be onboarded. A gateway/bridge platform hosts multiple 'virtual' devices that are mapped to peer virtual devices in a foreign network. Further, the gateway is an apparatus that collaborates to onboard virtual devices for both peers on each side of the local and foreign networks. Accordingly, in some further examples applicable to the onboarding and provisioning techniques discussed herein, more than one apparatus or component may collaborate to on-board as a representation of a single device.

Figure 4:
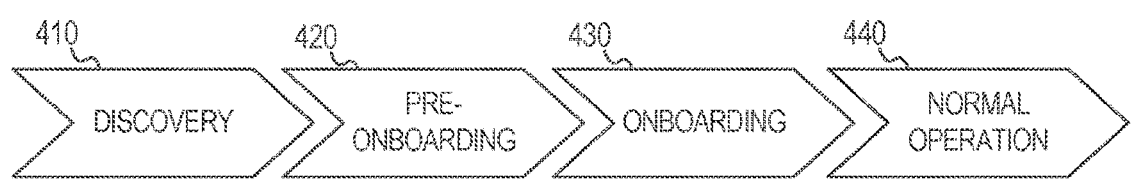
FIG. 4 illustrates a progression of device states in a lifecycle used to establish and perform communications within a network of IoT devices, according to an example.

FIG. 4 illustrates an example progression of device states in a lifecycle used to establish and perform communications within a network of IoT devices. In an example, the IoT communication lifecycle may be divided into the at least the following states: (1) Discovery 410; (2) Pre-Onboarding 420; (3) Onboarding 430; and (4) Normal operation 440. It will be understood that additional device states may be implemented such as off-boarding, provisioning, soft reset, hard reset, and so forth, but the following techniques relate to the specific operation of the discovery, pre-onboarding, and onboarding states for purposes of establishing communications with the device.

In Discovery 410, devices publish a unique but temporary value as a device ID (this temporary ID referred to as a "TID") and a flag indicating the device is available for onboarding (this availability flag being referred to as a "AFLAG"). The network communications for discovery may occur over an insecure channel that is monitored by legitimate or illegitimate (e.g., unauthorized o potentially malicious) entities. In an example, the TID is unique and is never re-used in connection with the device instance to avoid its use as a tracking value.

In Pre-Onboarding 420, onboarding tools may be used to discover both the AFLAG and TID for the logical device. These onboarding tools may also be used to find doppelganger device instances. In a further example, the onboarding tools may also use the Pre-Onboarding 420 to obtain device information. IoT frameworks typically supply additional attribute information that may be used to filter uninteresting or undesired devices. As a non-limiting example, if the onboarding tool is interested only in finding toaster devices, it may query candidate devices to be onboarded for devices of type 'toaster'. Nevertheless, there may be multiple toaster devices (including some of which may be doppelganger devices). The onboarding tool may operate to onboard identified instances of 'toaster' following the framework-defined onboarding methods, and these may result in the establishment of secure sessions to each instance. The onboarding in this Pre-Onboarding 420 phase, however, does not yet reveal the newly onboarded devices to a presentation layer of an application.

In Onboarding 430, further reprocessing may occur to identify additional characteristics of the device. During the Onboarding 430, the device may also change its AFLAG to FALSE, indicating to observers that this device is in the process of, or has been, onboarded. In Onboarding 430, observers may detect onboarding of multiple devices but cannot tell if they are doppelgangers or different physical devices. In an example, use of such "onboarding" operations causes an effect where a device becomes subject to full administrative control by the onboarding entity, or an effect of limited or partial control where the device retains an existing administrative control context and where the onboarding entity becomes one of possibly several administrative "tenants" having restricted ability to administer the device. For instance, the onboarding entity may be allowed to provision a new credential that enables interaction with the network (including a particular fog or cloud destination) but does not remove the device's existing ability to interact with a previous network (or fog or cloud).

In an example implementation of Onboarding 430, the device presents a second device identifier (this secure device identifier referred to as a "DID"), which is a device identifier that is communicated only via a secure session to the onboarding tool. In an example, the DID is unique with respect to the network (or fog or cloud entity) that is onboarding the device. Additionally, in a further example, the DID may also be defined to not be used (or re-used) by a second network (or fog or cloud). This prohibition of use by other networks may be established by selecting unique values from a large namespace such as a UUID (e.g., as defined by RFC4122) or a hash of a random number (e.g., as generated by hardware implementations such as Intel Digital Random Number Generator (DRNG)).

In a further example implementation of Onboarding 430, the physical device, knowing that it is hosting two or more frameworks, also presents a third device identifier (this physical device ID referred to as a "PID") in this secure session to the onboarding tool. The onboarding tool provisions the DID and PID identifiers to a secure directory or similar discovery channel that is not visible to observers of the cleartext discovery channel. This ensures privacy is preserved, and the identifiers directly tied to the physical device and the logical device instances of the physical device instance may remain private.

In an example, the secure session may be based on a device attestation, manufacture credential, user authentication, or other secure context (such as in contextual or context-aware computing) that establishes a context for negotiating symmetric keys. In an example, the context for negotiating symmetric keys may use Diffie-Hellman Key Exchange or Encrypted Key Exchange, Simple Password Exponential Key Exchange (SPEKE), Password Authenticated Key Exchange by Juggling (J-PAKE), or similar key exchange protocols, with such symmetric keys being used to 'secure' the context of the session. In this fashion, a secure session may be established with a device even in a scenario where the onboarding authority has not registered or onboarded the device a priori (e.g., ahead of time).

In Normal Operation 440, the multi-framework capable peer device may indicate that a device revealed through its framework-A interface is a doppelganger (a corresponding device) of a similar device revealed through its framework-B interface. This may be determined, for example, by discovering the device over the secure directory that tracks DID and PID identifiers, or by as a result of provisioning from credentials containing the PID. Thus, if an application on the peer observes there is a common PID for multiple DIDs, the peer device may identify the doppelganger logical devices and determine a best strategy for presenting a single representation of the physical device.

With this implementation, the onboarding network domain may be configured to prevent the disclosure or visibility of any device identifiers to external parties, except for the use of the unique (and non-reused) TIDs. All members (including guests/tenants) of the network domain are trusted not to disclose and reuse secure identifiers. The basis for trust may be provided through the use of a trusted execution environment (TEE) technology such as Intel SGX, Intel CSME or ARM TrustZone. For example, an attestation of the TEE may be included as part of a Sigma session (used to establish the secure onboarding session), with this attestation including evidence that the TEE technology is in use such that the above security and privacy goals are enforced by the TEE.

Figure 5:
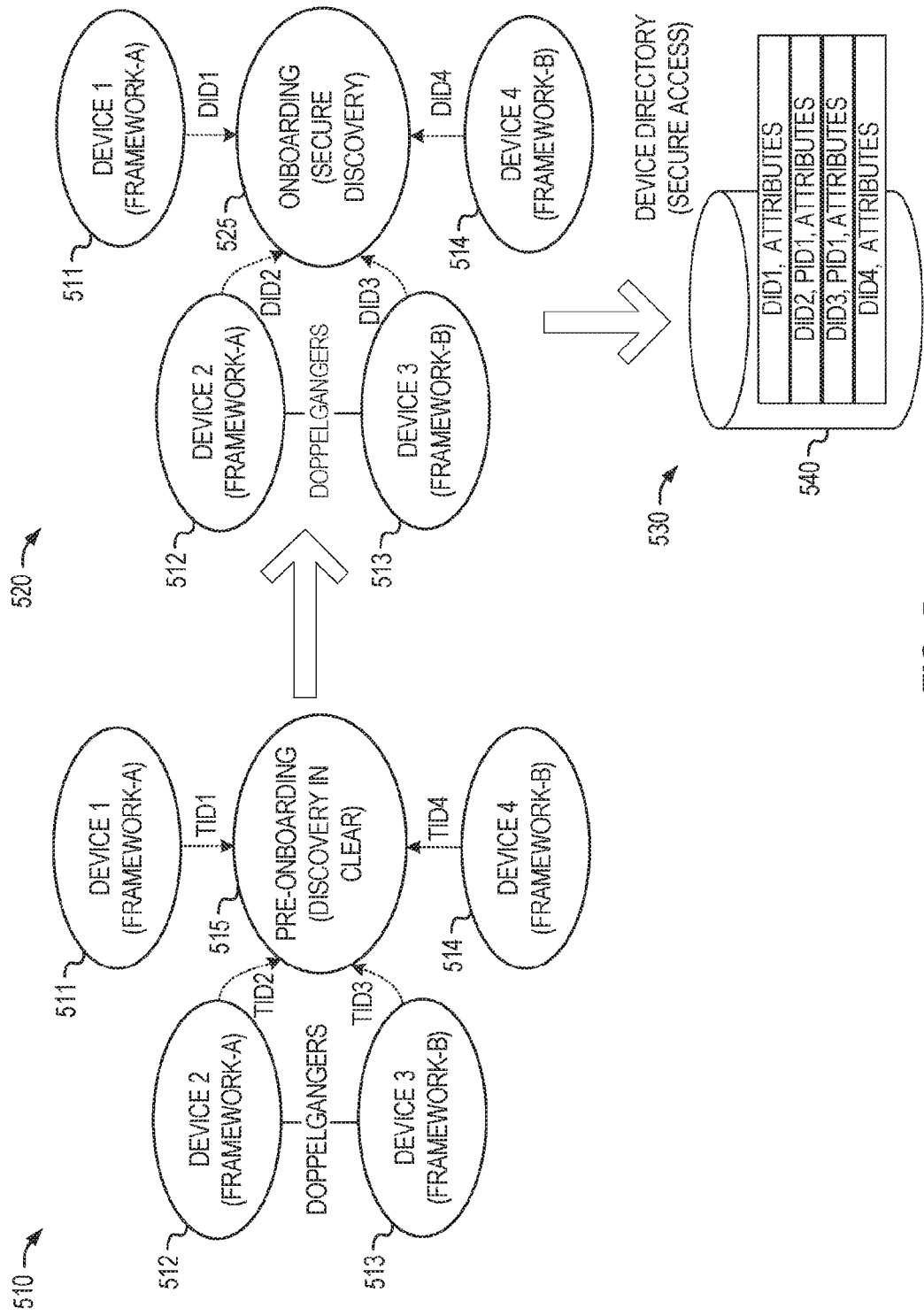
FIG. 5 illustrates a block diagram of discovery operations performed among IoT devices for two-stage onboarding, according to an example.

FIG. 5 illustrates an overview of discovery operations performed among IoT devices for two-stage onboarding. As shown, a pre-onboarding stage 510, involving discovery operations transmitted in the clear, is transitioned to a secure onboarding stage 520 where discovery operations are performed in a secure session. This is followed by directory information access 530 and completion of provisioning. As further discussed in the example below, this technique may be used among multiple device instances (including device network instances represented by doppelganger devices).

In the pre-onboarding stage 510, devices of network frameworks provide various TIDs to a pre-onboarding location 515 (e.g., an onboarding tool). This pre-onboarding occurs with discovery operations sent in the clear (e.g., in the clear on the physical communication medium). In the depicted pre-onboarding stage 510, device 1 511 is configured to communicate over a first network framework (Framework-A) and provides a TID1, device 2 512 is configured to communicate over the first network framework (Framework-A) and provides a TID2; device 3 513 is configured to communicate over a second network framework (Framework-B) and provides a TID3, and device 4 514 (Framework-B) is configured to communicate over the second network framework (Framework-B) and provides a TID4. Notably, device 2 512 and device 3 513 involve different frameworks, but the same physical device; thus, these devices are denoted as doppelgangers.

In the onboarding (secure discovery) stage 520, devices of a network provide various DIDs to an onboarding location 525 (e.g., the onboarding tool). This onboarding occurs with discovery operations securely communicated (e.g., in a secure session over the physical communication medium). In the depicted onboarding stage 520, device 1 511 is configured to communicate over a first network framework (Framework-A) and provides a DID1, device 2 512 is configured to communicate over the first network framework (Framework-A) and provides a DID2; device 3 513 is configured to communicate over a second network framework (Framework-B) and provides a DID3, and device 4 514 (Framework-B) is configured to communicate over the second network framework (Framework-B) and provides a DID4. Again, device 2 512 and device 3 513 involve different frameworks, but the same physical device and are denoted as doppelgangers.

After this two-stage onboarding, directory information access 530 occurs. The physical device corresponding to PID1 (providing logical Device 2 and Device 3) is established in a device directory 540 with two directory entries, one for the framework-A context (DID2) and another for the framework-B context (DID3). The respective device IDs (DIDs) are recorded in the device directory 540 so each framework may continue to manage the device according to framework specific device lifecycle. However, if an application needs to present a physical world view of the device, the application may identify doppelganger devices using a common PID (e.g., PID1).

In an example, the Framework-A onboarding tool provisions a secure directory key that introduces the device directory 540 (service provider) to each Framework-A device and similarly for Framework-B onboarding for Framework-B devices. This may use a traditional asymmetric key to authenticate the device directory 540.

In a further example, for distributed discovery, each device reports its own directory information. In this situation, the onboarding step may provision an enhanced privacy identifier (EPID) discovery key where each device is joined to the secure discovery group. For instance, when a Framework-A context device performs a discovery request, this device authenticates using a private EPID discovery key, and this device does not reveal a privacy sensitive DID or PID. The Framework-A context device may respond to the discovery request by signing with his private EPID discovery key. The Framework-A context device may also negotiate confidentiality keys, such as with a Sigma protocol (e.g., Signed Diffie-Hellman) such that the secure entry in the device directory 540 (e.g., "DID2, PID2, Attributes . . . ") is not exposed in cleartext over the physical communication medium.

Figure 6:
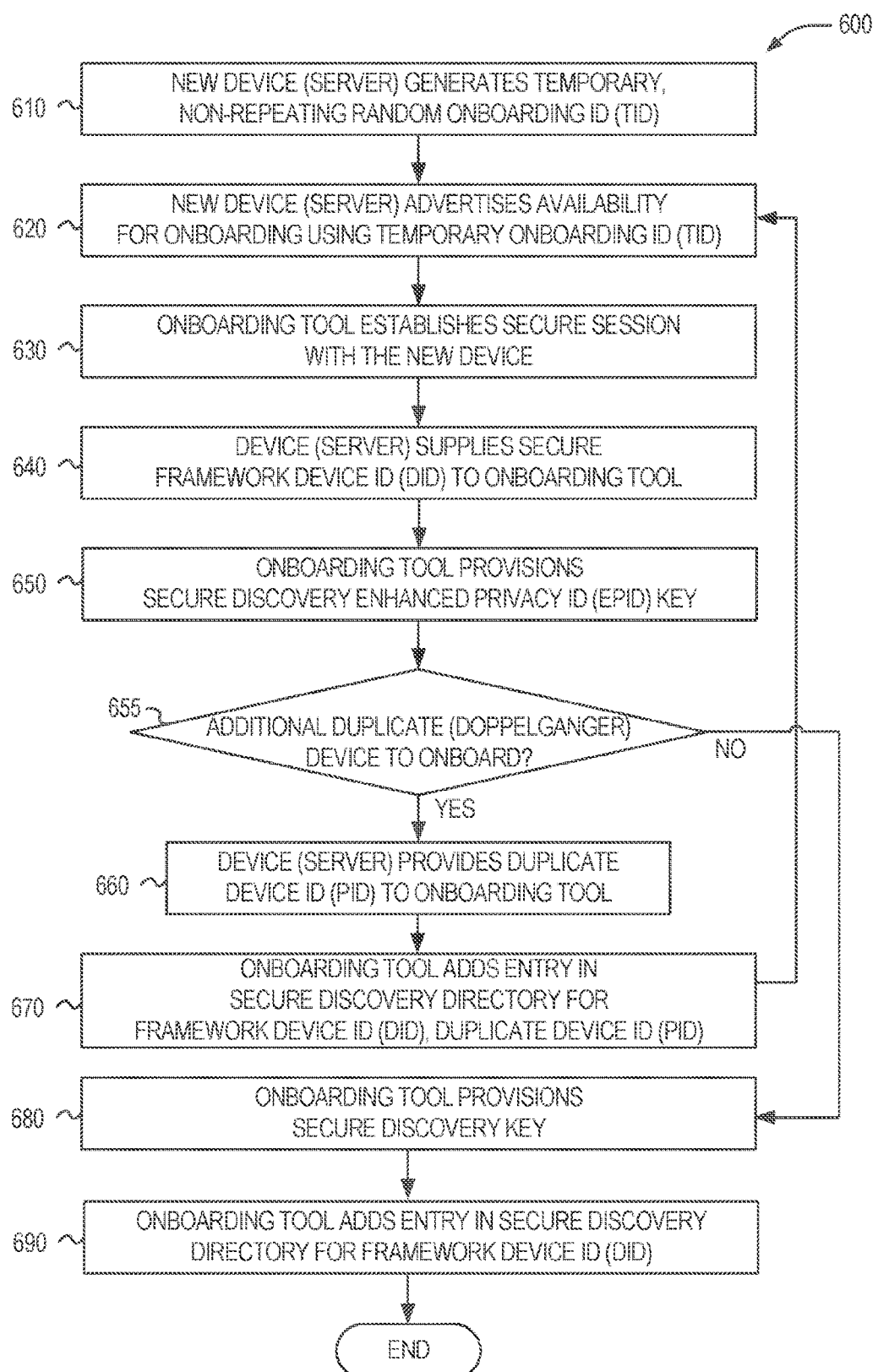
FIG. 6 illustrates a flowchart of operations for implementing pre-onboarding and secure onboarding operations, according to an example.

FIG. 6 illustrates a flowchart 600 of example operations for implementing pre-onboarding and secure onboarding operations. In an optional precondition, not shown, a new IoT device is evaluated to determine whether the device is ready for onboarding. For example, this precondition evaluation may be based on whether information is provided by the IoT device (e.g., published on the network) to advertise that the device is ready for onboarding. If this information is not provided, or information indicates that the IoT device instance is not ready for onboarding, then the process ends. If the IoT device instance is ready for onboarding, the operations of the flowchart 600 continue.

The operations of the flowchart 600 include the generation of a temporary, non-repeating random onboarding identifier (a TID) (operation 610), and the communication of this temporary onboarding identifier (TID) to a network. The device's availability for onboarding is also advertised to the network, with use of the temporary onboarding ID (TID) (operation 620). An onboarding tool then detects the availability of the device for onboarding, and establishes a secure session with the new device via the network for onboarding procedures (operation 630). This secure session may be established through any number of predefined authentication techniques or security protocols.

The operations of the flowchart 600 continue with onboarding procedures, including the device providing the onboarding tool with a secure framework device identifier (DID) (operation 640), and the onboarding tool provisioning the device with use of the secure framework device identifier and a secure discovery enhanced privacy identifier (EPID) key (operation 650). This provisioning may occur in connection with a distributed or non-distributed secure directory (as discussed below for the example operations in FIG. 7).

The operations of the flowchart 600 may further include additional steps performed in the case that duplicate device instances (doppelganger devices) are associated with a same physical device, and are available to onboard (evaluation 655). Various operations may be performed by the onboarding tool to detect, track, and evaluate whether such duplicate (doppelganger) device instances are available to onboard. If there are duplicate (doppelganger) devices to onboard, then the device instance provides the onboarding tool with a duplicate device identifier (of the physical device, a PID) (operation 660). The onboarding tool then performs provisioning in the secure directory with the association of the framework device identifier (DID) to the duplicate device identifier (of the physical device, the PID) (operation 670). The operations of pre-onboarding and onboarding are then repeated for the duplicate device instance (the doppelganger) (operations 620-650). If no duplicate device instances are available to onboard, then the flowchart 600 continues with the onboarding tool performing provisioning of the device instance in the secure directory, using the secure discovery key (operation 680). Finally, the onboarding tool adds an entry in the secure directory for the device instance based on the framework device identifier (DID) (operation 690).

In a further example, it is theoretically possible for a malicious attack device to query the new device's TID value, and attempt use of the TID as a rogue actor. This technique might allow the malicious attack device to respond to the onboarding tool's discovery request, potentially confusing it with multiple entries having the same TID. An orchestrated attack in this fashion could result in in a denial of service attack (e.g., if the onboarding tool chose to attempt to onboard all respondents). Such an attack may be mitigated by ignoring duplicate responses. Further, an onboarding tool may detect a malicious attack host by requiring the respondents to connect using a secure-anonymous session (such as anonymous Diffie-Hellman). Additionally, the onboarding tool may negotiate authentication credentials such as manufacturing certificates, attestation and pairing secrets as necessary to properly trust the device before entering the secure discovery phase.

Figure 7:
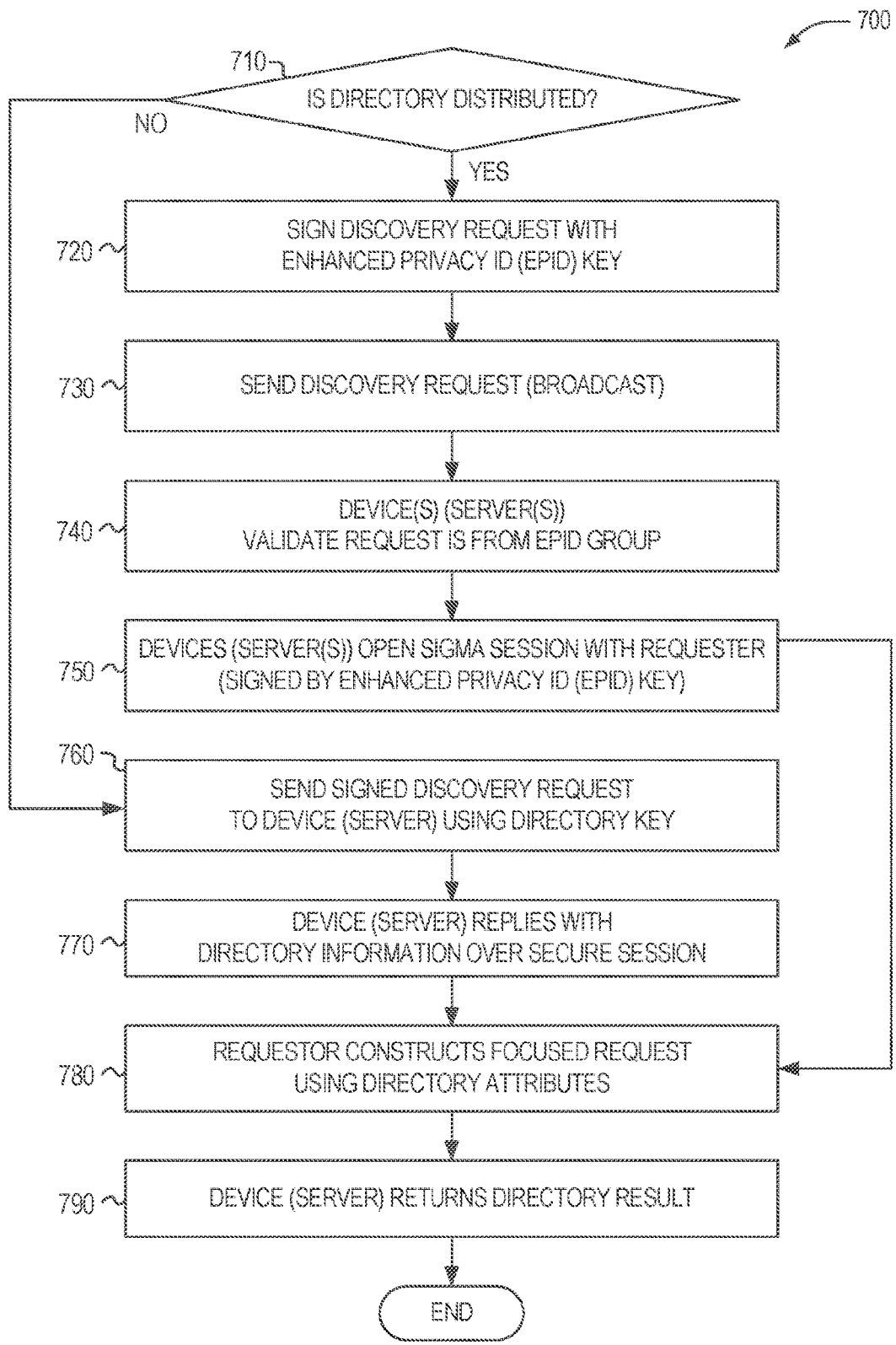
FIG. 7 illustrates a flowchart of further operations for implementing secure discovery operations, with use of multiple access control objects, according to an example.

FIG. 7 illustrates a flowchart 700 of further example operations for implementing secure discovery operations, from a requestor (e.g., onboarding tool) as part of an onboarding process for a device onboarding to a network. The flowchart 700 specifically illustrates the example where a secure directory used for maintaining the provisioning information of the network may be distributed (operations 720-750) or not distributed (operations 760-770) (e.g., distributed among the network framework with use of various IoT devices). In an optional precondition, not shown, the operations of flowchart 700 are performed only if secure discovery is desired. If secure discovery is not desired or implemented, then the operations end.

In the example that secure discovery is desired, and the secure directory is distributed in the network framework (evaluation 710), operations are then performed to discover the secure directory locations. These operations include the signature of a discovery request with a secure authentication signature, such as an enhanced privacy identifier (EPID) key (operation 720) and the transmission of this discovery request, such as in a broadcast from the onboarding tool to the network (operation 730). The respective receiving devices that implement the secure directory (e.g., servers operating on the respective receiving devices) will then validate that the request is from a legitimate group, such as a group associated with the EPID key (operation 740). Ultimately, the respective receiving devices (servers) of the secure directory opens a secure and authenticated session (operation 750) such as an authenticated session established with use of the SIGMA family of key-exchange protocols, and being securely signed by the EPID key.

In the example that secure discovery is desired, and the secure directory is not distributed in the network framework, a secure discovery request is sent to a directory server (a secure directory device) using a directory key (operation 760). The secure directory device replies with directory information, using a secure session (operation 770).

With the use of this secure session to the secure directory, the requestor (e.g., the onboarding tool) constructs a focused request for information from the secure directory device (e.g., directory server) using directory attributes (operation 780). Finally, in response to the request, the secure directory device (e.g., directory server) returns the directory result (operation 790).

Figure 8:
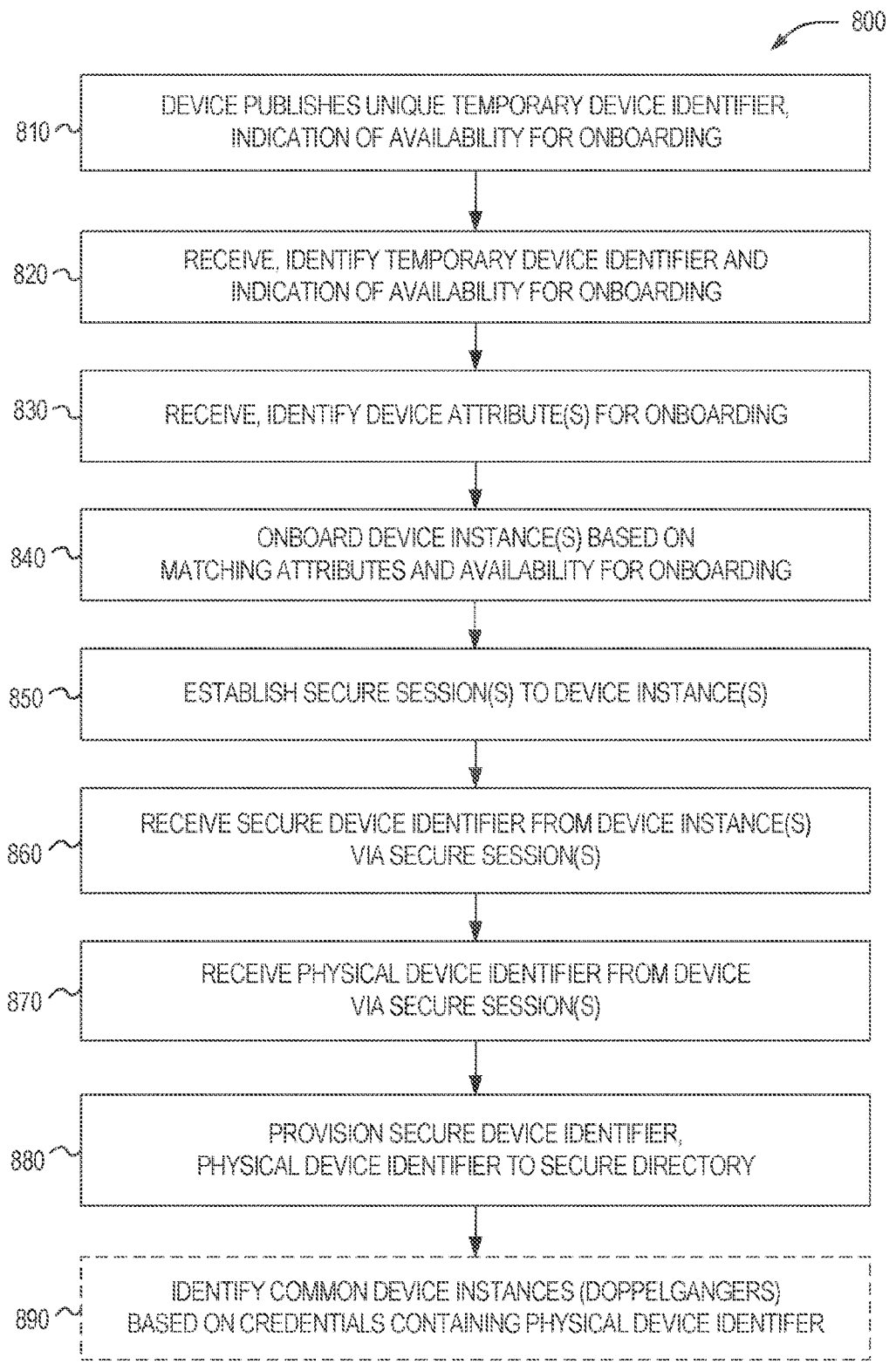
FIG. 8 is a flowchart illustrating a method of facilitating network discovery and onboarding in an IoT device deployment, according to an example.

FIG. 8 illustrates a flowchart 800 illustrating an example method of facilitating network discovery and onboarding in an IoT device deployment. The following operations of the flowchart 800 may be conducted by an electronic processing system (including a specialized computing device) adapted to perform the discovery, pre-onboarding, and secure onboarding operations in accordance with any of the techniques discussed herein. For example, the operations of the flowchart 800 may be performed by an onboarding tool operating to manage onboarding and provisioning operations for a plurality of devices in a network. It will be understood that the operations of the flowchart 800 may also be performed by other forms and types of devices, with the sequence and type of operations of the flowchart 800 potentially modified based on the other examples of security, device configuration, access control, or configuration techniques, including variations of those techniques indicated above.

The operations of the flowchart 800 include the initial operation for a device attempting to begin onboarding, by the device instance publishing a unique temporary device identifier, and an indication of availability for onboarding (operation 810). In an example, the temporary device identifier and the indication of the availability for onboarding is published by the device instance in an unsecure communication via the network. The onboarding tool, operating on the network, receives and identifies the temporary device identifier and the indication of the availability for onboarding (operation 820); the onboarding tool, operating on the network, also receives and identifies at least one attribute of the device instance (operation 830). Operations to perform onboarding then may be commenced to onboard the device instance onto the network, in response to evaluation of the at least one attribute and the indication of the availability for onboarding for the device instance.

The operations of the flowchart continue with operations to onboard the device instance onto a network (and in some examples, a fog or cloud implementation of a network), based on matching attributes and availability for onboarding (operation 840). A secure session then may be established with the device instance (operation 850), followed by the receipt of a secure device identifier from the device instance, in the secure session (operation 860).

The example operations of the flowchart 800, used for the management of multiple device instances (and doppelganger device instances), the flowchart 800 invokes operations to receive a physical device identifier of a physical device operating the multiple device instances, in the secure session (or multiple secure sessions) (operation 870). As a result, the secure device identifier (corresponding to a particular device instance) and the physical device identifier (corresponding to the physical device) may be provisioned in a secure directory (operation 880).

In a further example, the operations to provision the device instance include operations to provision a secure discovery enhanced privacy identifier (EPID) key for use in secure communications via the network; the operations to provision the device instance for operation in the network may also include operations to provision a secure discovery key for use in secure communications via the network. However, it will be understood that these techniques may be varied in the case that only one device instance of a physical device is being provisioned.

The operations of the flowchart 800 conclude with optional operations that identify common device instances (doppelgangers) based on credentials or other information from the secure directory, containing a common physical device identifier (operation 890). Further, with use of the information from a secure directory, a requesting device may retrieve information for the device instance (or multiple device instances) from the secure directory, and perform secure communications with the respective device instance based on the retrieved information. For example, these secure communications with a respective device instance could be conducted according to at least one interconnected device network framework, such as a network framework operating according to an Open Connectivity Foundation (OCF) compliant standard.

Figure 9:
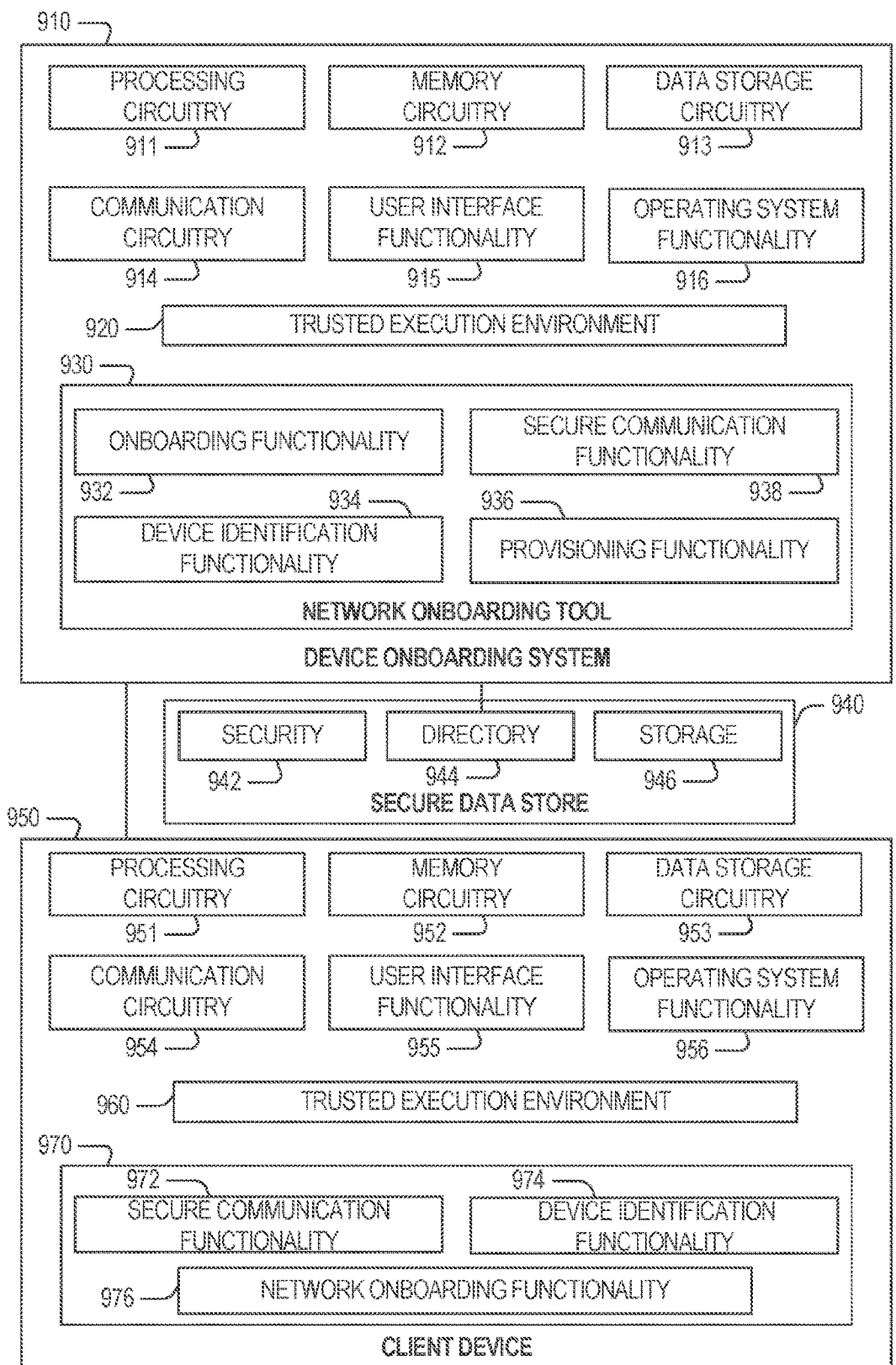
FIG. 9 illustrates a block diagram of components in an example system configuration for facilitating network discovery and onboarding of an IoT device instance, according to an example.

FIG. 9 illustrates a block diagram of components in an example system configuration for facilitating network discovery and onboarding of an IoT device. As shown, the block diagram depicts an electronic processing system 910 such as may be embodied by an IoT device provided in the form of a computing or other electronic processing device (e.g., in operation for device onboarding). The electronic processing system 910 includes circuitry (described below) operably coupled to a trusted execution environment 920 and a network onboarding tool 930, for instance from the operation of the trusted execution environment 920 and the network onboarding tool 930 as software-configured circuitry.

The circuitry of the electronic processing system 910 is depicted as including: processing circuitry 911 (e.g., a CPU) and memory circuitry 912 (e.g., volatile or non-volatile memory) used to control and process electronic operations of the system, including onboarding and provisioning operations discussed herein; data storage circuitry 913 to store onboarding, provisioning, or network communication information, authentication data, and control instructions for operation of the electronic processing system 910; communications circuitry 914 to communicate (e.g., wired or wirelessly) with an external network or devices; user interface functionality 915 (e.g., a display unit or display features implemented with the processing circuitry 911 and memory circuitry 912) to implement a user interface, e.g., to output a display with a user interface hardware device; and operating system functionality 916 (e.g., features implemented with the processing circuitry 911 and memory circuitry 912) to implement system control and operational features, including use of the onboarding and provisioning functionality discussed herein.

The trusted execution environment 920 is depicted as operational in the electronic processing system 910 and may include any number of features including a trusted platform module (TPM), a Secure Boot mechanism, a secure enclave, or a virtual machine instance. For example, the trusted execution environment 920 may operate in connection with the network onboarding tool 930 or other aspects of the device onboarding system to facilitate the exchange of secure credentials and information, the execution of trusted software instructions, or access to trusted and secure data.

The network onboarding tool 930 is depicted as including onboarding functionality 932, device identification functionality 934, secure communication functionality 936, and provisioning functionality 938. In an example, the network onboarding tool 930 may be provided from specialized hardware operating independent from the processing circuitry 911 and the memory circuitry 912; in other examples, the network onboarding tool 930 may be software-configured hardware that is implemented with use of the processing circuitry 911 and the memory circuitry 912 (e.g., by instructions executed by the processing circuitry 911 and the memory circuitry 912).

The onboarding functionality 932, for example, may operate in connection with the pre-onboarding and secure onboarding phases discussed above with reference to FIGS. 5 and 6. The device identification functionality 934, for example, may operate to facilitate the collection of temporary (e.g., TIDs) and framework (e.g., DID) device identifiers discussed above with reference to FIGS. 5 and 6. The secure communication functionality 936, for example, may operate to facilitate the secure communication sessions used for onboarding and provisioning, discussed above with reference to FIGS. 5 and 6. The provisioning functionality 938, for example, may operate to facilitate the secure directory provisioning techniques discussed above with reference to FIGS. 6 and 7.

The network onboarding tool 930 and the electronic processing system 910 may also include other components, not depicted, for implementation of other forms of authentication, security, and device management operations. Further, the operation of the network onboarding tool 930 may be further affected by other inputs and outputs received over the network or from users, including those received with input control components (e.g., buttons, touchscreen input, external peripheral devices), and those provided by output components (e.g., a touchscreen display screen, video or audio output, etc.).

The electronic processing system 910 is shown as being communicatively coupled with a secure data store 940 and a client device 950. The secure data store 940 may provide features of a secure directory for network framework provisioning as discussed above with reference to FIGS. 5 to 7, including aspects of security functionality 942, directory functionality 944, and storage 946 to host information for such security and directory purposes.

The client device 950 is shown as including processing circuitry 951, memory circuitry 952, data storage circuitry 953, communication circuitry 954, user interface functionality 955, operating system functionality 956, and a trusted execution environment 960. In an example, the features of these components 951-960 correspond to those provided in the electronic processing system 910. The client device 950 is also shown as including client onboarding and provisioning functionality 970, including: secure communication functionality 972, such as to communicate with the network onboarding tool in a secure session as described above with reference to FIGS. 5 to 6; device identification functionality 974, such as to provide the various identifiers for discovery, onboarding, and provisioning as described above with reference to FIGS. 5 and 6; and network onboarding functionality 976, to provide information to onboard the client device 950 as described above with reference to FIGS. 5,6, and 8.

In further examples, the operations and functionality described above with reference to FIGS. 3 to 9 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 10:
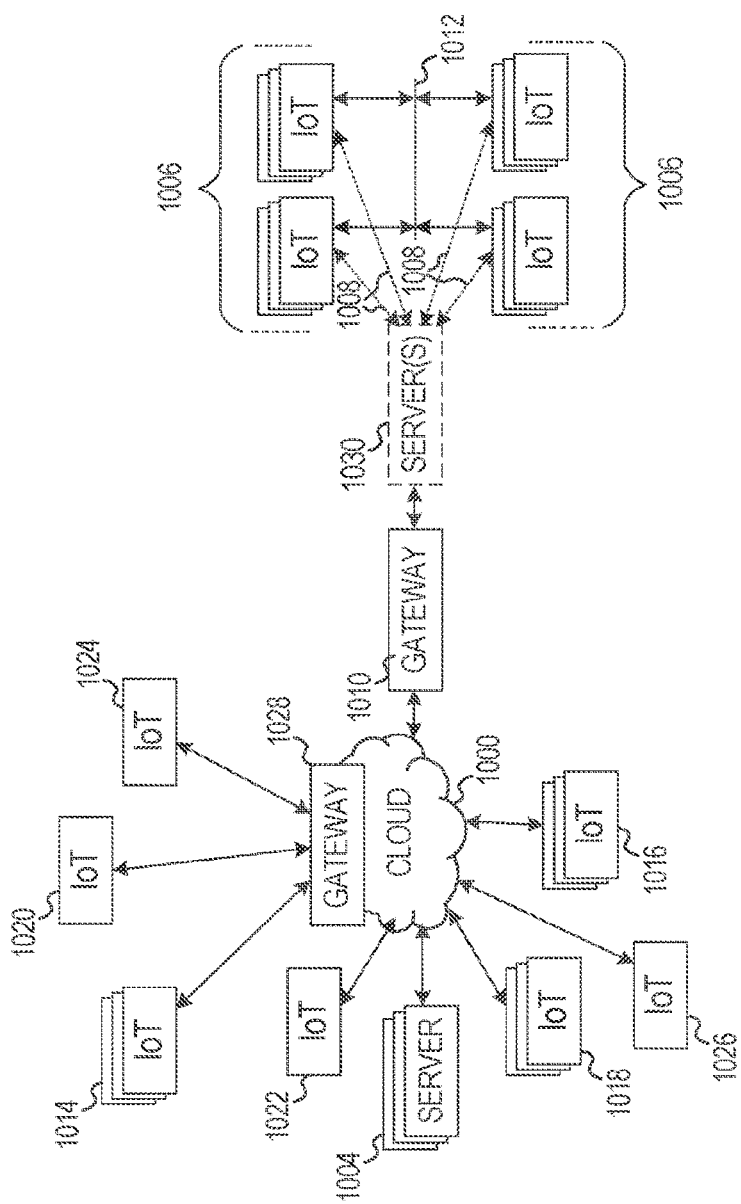
FIG. 10 illustrates a block diagram of a network illustrating communications among a number of IoT devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 2), or a combination therein. The groups of IoT devices may be deployed in various residential, commercial, industrial, settings (including both private or public settings).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 2).

Figure 11:
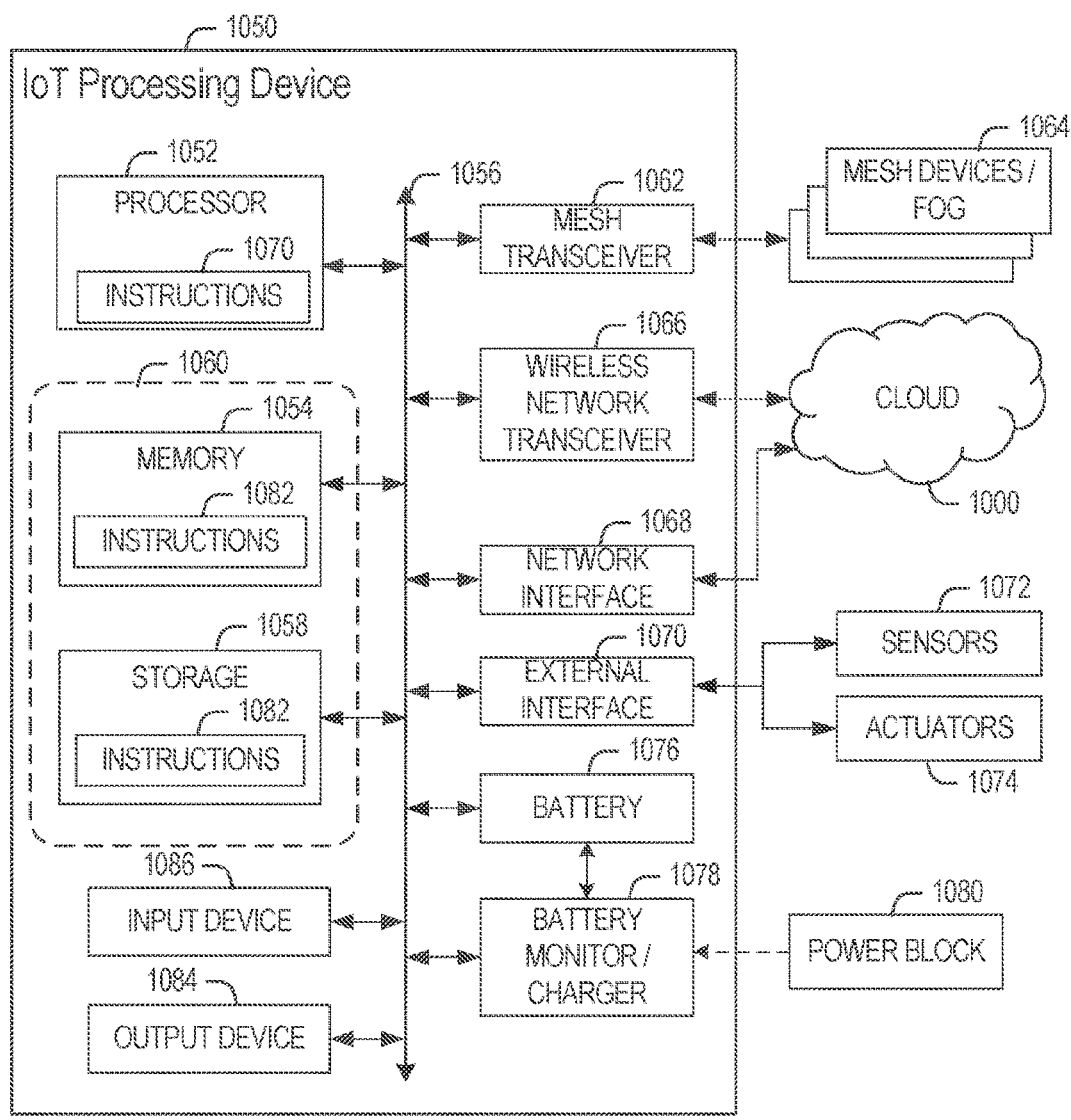
FIG. 11 illustrates a block diagram for an example IoT processing system architecture upon which any one or more of the techniques (e.g., operations, processes, methods, and methodologies) discussed herein may be performed, according to an example.

FIG. 11 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 11 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an 12C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (CPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 13 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart of operations in FIGS. 6 to 8.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus to facilitate network discovery and onboarding of a device, the apparatus comprising processing circuitry to perform operations that: receive a unique temporary device identifier from a device instance, the device instance indicating availability for onboarding onto a network; onboard the device instance onto the network; establish a secure session with the device instance via the network; receive, in the secure session, a secure device identifier; and initiate provisioning of the device instance in a secure directory based on the secure device identifier.

In Example 2, the subject matter of Example 1 optionally includes operations that: receive, in the secure session, a physical device identifier, wherein the physical device identifier is unique to a physical device operating the device instance; wherein the provisioning of the device instance in the secure directory is further based on the physical device identifier.

In Example 3, the subject matter of Example 2 optionally includes operations that: onboard a second device instance onto a second network, the second device instance being provided from the physical device, wherein the physical device operates the device instance and the second device instance; establish a second secure session with the second device instance via the second network; receive, in the second secure session, a second secure device identifier; and initiate provisioning of the second device instance for operation in the second network, wherein the second device instance is provisioned in the secure directory based on the second secure device identifier and the physical device identifier.

In Example 4, the subject matter of any one or more of Examples 2-3 optionally include operations that: identify the physical device as having multiple device instances based on use of the physical device identifier in the secure directory.

In Example 5, the subject matter of any one or more of Examples 1-4 optionally include operations that: receive, from the device instance, an indication of the availability for onboarding for the device instance; and receive, from the device instance, at least one attribute of the device instance; wherein the operations to onboard the device instance onto the network are performed in response to evaluation of the at least one attribute and the indication of the availability for onboarding for the device instance.

In Example 6, the subject matter of any one or more of Examples 1-5 optionally include the temporary device identifier and an indication of the availability for onboarding being published by the device instance in an unsecure communication via the network.

In Example 7, the subject matter of any one or more of Examples 1-6 optionally include the operations being initiated by an onboarding tool executed by the processing circuitry of the apparatus, the onboarding tool operating to manage onboarding and provisioning operations for a plurality of devices in the network.

In Example 8, the subject matter of any one or more of Examples 1-7 optionally include the operations to provision the device instance including operations to provision a secure discovery enhanced privacy identifier (EPID) key for use in secure communications via the network.

In Example 9, the subject matter of any one or more of Examples 1-8 optionally include the operations to provision the device instance for operation in the network including operations to provision a secure discovery key for use in secure communications via the network.

In Example 10, the subject matter of any one or more of Examples 1-9 optionally including the secure directory being distributed among a plurality of devices of the network.

In Example 11, the subject matter of any one or more of Examples 1-optionally include operations that: retrieve information for the device instance from the secure directory; and perform secure communications with the device instance based on the retrieved information from the secure directory; wherein the network is arranged into a fog or cloud configuration connecting a plurality of devices; wherein the secure communications with the device instance are conducted according to at least one interconnected device network framework; and wherein the at least one interconnected device network framework includes a network framework provided according to an Open Connectivity Foundation (OCF) compliant standard.

Example 12 is at least one machine readable storage medium, comprising a plurality of instructions adapted for facilitating network discovery and onboarding, wherein the instructions, responsive to being executed with processor circuitry of a machine, cause the processor circuitry to perform operations that: receive a unique temporary device identifier from a device instance, the device instance indicating availability for onboarding onto a network; onboard the device instance onto the network; establish a secure session with the device instance via the network; receive, in the secure session, a secure device identifier; and initiate provisioning of the device instance in a secure directory based on the secure device identifier.

In Example 13, the subject matter of Example 12 optionally includes instructions to further cause the processor circuitry to perform operations that: receive, in the secure session, a physical device identifier, wherein the physical device identifier is unique to a physical device operating the device instance; wherein the provisioning of the device instance in the secure directory is further based on the physical device identifier.

In Example 14, the subject matter of Example 13 optionally includes instructions to further cause the processor circuitry to perform operations that: onboard a second device instance onto a second network, the second device instance being provided from the physical device, wherein the physical device operates the device instance and the second device instance; establish a second secure session with the second device instance via the second network; receive, in the second secure session, a second secure device identifier; and initiate provisioning of the second device instance for operation in the second network, wherein the second device instance is provisioned in the secure directory based on the second secure device identifier and the physical device identifier.

In Example 15, the subject matter of any one or more of Examples 13-14 optionally include instructions to further cause the processor circuitry to perform operations that: identify the physical device as having multiple device instances based on use of the physical device identifier in the secure directory.

In Example 16, the subject matter of any one or more of Examples 12-optionally include instructions to further cause the processor circuitry to perform operations that: receive, from the device instance, an indication of the availability for onboarding for the device instance; and receive, from the device instance, at least one attribute of the device instance; wherein the operations to onboard the device instance onto the network are performed in response to evaluation of the at least one attribute and the indication of the availability for onboarding for the device instance.

In Example 17, the subject matter of any one or more of Examples 12-16 optionally include the temporary device identifier and an indication of the availability for onboarding being published by the device instance in an unsecure communication via the network.

In Example 18, the subject matter of any one or more of Examples 12-17 optionally include the operations being initiated by an onboarding tool, the onboarding tool operating to manage onboarding and provisioning operations for a plurality of devices in the network.

In Example 19, the subject matter of any one or more of Examples 12-18 optionally include operations to provision the device instance for operation in the network with operations to: provision a secure discovery enhanced privacy identifier (EPID) key for use in secure communications via the network.

In Example 20, the subject matter of any one or more of Examples 12-19 optionally include operations to provision the device instance for operation in the network with operations to: provision a secure discovery key for use in secure communications via the network.

In Example 21, the subject matter of any one or more of Examples 12-20 optionally include the secure directory being distributed among a plurality of devices of the network.

In Example 22, the subject matter of any one or more of Examples 12-21 optionally include instructions to further cause the processor circuitry to perform operations that: retrieve information for the device instance from the secure directory; and perform secure communications with the device instance based on the retrieved information from the secure directory.

In Example 23, the subject matter of Example 22 optionally includes the network being arranged into a fog or cloud configuration connecting a plurality of devices, wherein the secure communications with the device instance are conducted according to at least one interconnected device network framework, wherein the at least one interconnected device network framework includes a network framework provided according to an Open Connectivity Foundation (OCF) compliant standard.

Example 24 is a method of facilitating network discovery and onboarding, the method comprising operations performed in an electronic processing system, including: receiving a unique temporary device identifier from a device instance, the device instance indicating availability for onboarding onto a network; onboarding the device instance onto the network: establishing a secure session with the device instance via the network; receiving, in the secure session, a secure device identifier; and provisioning the device instance in a secure directory based on the secure device identifier.

In Example 25, the subject matter of Example 24 optionally includes the electronic operations further including: receiving, in the secure session, a physical device identifier, wherein the physical device identifier is unique to a physical device operating the device instance; wherein the provisioning of the device instance in the secure directory is further based on the physical device identifier.

In Example 26, the subject matter of Example 25 optionally includes the electronic operations further including:

onboarding a second device instance onto a second network, the second device instance being provided from the physical device, wherein the physical device operates the device instance and the second device instance; establishing a second secure session with the second device instance via the second network; receiving, in the second secure session, a second secure device identifier; and initiating provisioning of the second device instance for operation in the second network, wherein the second device instance is provisioned in the secure directory based on the second secure device identifier and the physical device identifier.

In Example 27, the subject matter of any one or more of Examples 25-26 optionally include the electronic operations further including: identifying the physical device as having multiple device instances based on use of the physical device identifier in the secure directory.

In Example 28, the subject matter of any one or more of Examples 24-27 optionally include the electronic operations further including: receiving, from the device instance, an indication of the availability for onboarding for the device instance; and receiving, from the device instance, at least one attribute of the device instance; wherein the operations to onboard the device instance onto the network are performed in response to evaluation of the at least one attribute and the indication of the availability for onboarding for the device instance.

In Example 29, the subject matter of any one or more of Examples 24-28 optionally include the temporary device identifier and an indication of the availability for onboarding being published by the device instance in an unsecure communication via the network.

In Example 30, the subject matter of any one or more of Examples 24-29 optionally include the operations being initiated by an onboarding tool, the onboarding tool operating to manage onboarding and provisioning operations for a plurality of devices in the network.

In Example 31, the subject matter of any one or more of Examples 24-30 optionally include provisioning the device instance for operation in the network including provisioning a secure discovery enhanced privacy identifier (EPID) key for use in secure communications via the network.

In Example 32, the subject matter of any one or more of Examples 24-31 optionally include provisioning the device instance for operation in the network including provisioning a secure discovery key for use in secure communications via the network.

In Example 33, the subject matter of any one or more of Examples 24-32 optionally include the secure directory being distributed among a plurality of devices of the network.

In Example 34, the subject matter of any one or more of Examples 24-33 optionally include the electronic operations further including: retrieving information for the device instance from the secure directory; and performing secure communications with the device instance based on the retrieved information from the secure directory.

In Example 35, the subject matter of Example 34 optionally includes wherein the network is arranged into a fog or cloud configuration connecting a plurality of devices, wherein the secure communications with the device instance are conducted according to at least one interconnected device network framework, wherein the at least one interconnected device network framework includes a network framework provided according to an Open Connectivity Foundation (OCF) compliant standard.

Example 36 is at least one machine readable medium including instructions, which when executed by a computing system, cause the computing system to perform any of the methods of Examples 24-35.

Example 37 is an apparatus comprising means for performing any of the methods of Examples 24-35.

Example 38 is an apparatus, comprising: means for receiving a unique temporary device identifier from a device instance, the device instance indicating availability for onboarding onto a network; means for onboarding the device instance onto the network; means for establishing a secure session with the device instance via the network; means for receiving, in the secure session, a secure device identifier; and means for provisioning the device instance in a secure directory based on the secure device identifier.

In Example 39, the subject matter of Example 38 optionally includes means for receiving, in the secure session, a physical device identifier, wherein the physical device identifier is unique to a physical device operating the device instance; wherein the provisioning of the device instance in the secure directory is further based on the physical device identifier.

In Example 40, the subject matter of Example 39 optionally includes means for onboarding a second device instance onto a second network, the second device instance being provided from the physical device, wherein the physical device operates the device instance and the second device instance; means for establishing a second secure session with the second device instance via the second network; means for receiving, in the second secure session, a second secure device identifier; and means for initiating provisioning of the second device instance for operation in the second network, wherein the second device instance is provisioned in the secure directory based on the second secure device identifier and the physical device identifier.

In Example 41, the subject matter of any one or more of Examples 39-40 optionally include means for identifying the physical device as having multiple device instances based on use of the physical device identifier in the secure directory.

In Example 42, the subject matter of any one or more of Examples 38-41 optionally include means for receiving, from the device instance, an indication of the availability for onboarding for the device instance; and means for receiving, from the device instance, at least one attribute of the device instance; wherein operations to onboard the device instance onto the network are performed in response to evaluation of the at least one attribute and the indication of the availability for onboarding for the device instance.

In Example 43, the subject matter of any one or more of Examples 38-42 optionally include means for receiving the temporary device identifier and an indication of the availability for onboarding from the device instance in an unsecure communication via the network.

In Example 44, the subject matter of any one or more of Examples 38-43 optionally include means for performing the operations in an onboarding tool, the onboarding tool operating to manage the onboarding and provisioning operations for a plurality of devices in the network.

In Example 45, the subject matter of any one or more of Examples 38-44 optionally include means for provisioning a secure discovery enhanced privacy identifier (EPID) key for use in secure communications via the network.

In Example 46, the subject matter of any one or more of Examples 38-45 optionally include means for provisioning a secure discovery key for use in secure communications via the network.

In Example 47, the subject matter of any one or more of Examples 38-46 optionally include means for operating the secure directory as a distributed directory among a plurality of devices of the network.

In Example 48, the subject matter of any one or more of Examples 38-47 optionally include means for retrieving information for the device instance from the secure directory; and means for performing secure communications with the device instance based on the retrieved information from the secure directory.

In Example 49, the subject matter of any one or more of Examples 38-48 optionally include means for communicating with the network as arranged into a fog or cloud configuration connecting a plurality of devices; and means for providing secure communications with the device instance as conducted according to at least one interconnected device network framework, wherein the at least one interconnected device network framework includes a network framework provided according to an Open Connectivity Foundation (OCF) compliant standard.

Example 50 is at least one machine-readable medium including instructions, which when executed by a machine, cause the machine to perform operations of any of the operations embodied by Examples 1-49.

Example 51 is an apparatus comprising means for performing any of the operations embodied by Examples 1-49.

Example 52 is a system to perform the operations embodied by any of Examples 1-49.

Example 53 is a method to perform the operations embodied by any of Examples 1-49.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A method of network discovery and onboarding, implemented with electronic operations performed in at least one apparatus, the method comprising:
    activating a first device instance for communication in a first network framework, the first device instance being provided from a device that hosts the first device instance;
    associating a first secure device identifier with the first device instance, for identification of the first device instance in the first network framework;
    activating a second device instance for communication in a second network framework, the second device instance being provided from the device, the device hosting the second device instance in addition to the first device instance;
    associating a second secure device identifier with the second device instance, for identification of the second device instance in the second network framework; and
    causing provisioning of the second device instance to enable operation in the second network framework, wherein the second device instance is provisioned in a secure directory based on the second secure device identifier.

2. The method of claim 1, further comprising:
    causing provisioning of the first device instance to enable operation in the first network framework, wherein the first device instance is provisioned in the secure directory based on the first secure device identifier.

3. The method of claim 2, further comprising:
    retrieving information for the first device instance from the secure directory; and
    perform secure communications with the first device instance based on the retrieved information from the secure directory;
    wherein the secure directory is distributed among a plurality of devices of the first network framework.

4. The method of claim 1, further comprising:
    receiving, from the first device instance, an indication of availability for onboarding for the first device instance; and
    receiving, from the first device instance, at least one attribute of the first device instance;
    wherein the operations to activate the first device instance onto the first network framework are performed in response to evaluation of the at least one attribute and the indication of the availability for onboarding for the first device instance.

5. The method of claim 1, further comprising:
    establishing a secure session with the first device instance via the first network framework; and
    receiving, in the secure session, a physical device identifier, wherein the physical device identifier is unique to the device that hosts the first device instance and the second device instance;
    wherein the provisioning of the first device instance and the second device instance is further based on the physical device identifier.

6. The method of claim 1, further comprising:
    receiving a unique temporary device identifier from the first device instance, the first device instance indicating availability of the first device instance for onboarding onto the first network framework;
    wherein the temporary device identifier and an indication of the availability for onboarding is published by the first device instance in an unsecure communication via the first network framework.

7. The method of claim 6, wherein the temporary device identifier is a non-repeating value generated by the first device instance.

8. The method of claim 1, wherein the electronic operations are coordinated by an onboarding tool, the onboarding tool operating to manage onboarding and provisioning operations for a plurality of devices in multiple network frameworks, and wherein the first network framework and the second network framework operate using different network topologies.

9. An apparatus to facilitate network discovery and onboarding of a device, the apparatus comprising:
    network communication circuitry to communicate with a device; and
    processing circuitry to perform operations that:
        activate a first device instance for communication in a first network framework, the first device instance being provided from the device that hosts the first device instance;
        associate a first secure device identifier with the first device instance, for identification of the first device instance in the first network framework;
        activate a second device instance for communication in a second network framework, the second device instance being provided from the device, the device hosting the second device instance in addition to the first device instance;

associate a second secure device identifier with the second device instance, for identification of the second device instance in the second network framework; and cause provisioning of the second device instance for operation in the second network framework, wherein the second device instance is provisioned in a secure directory based on the second secure device identifier.

10. The apparatus of claim 9, the processing circuitry to perform further operations that:

cause provisioning of the first device instance for operation in the first network framework, wherein the first device instance is provisioned in the secure directory based on the first secure device identifier.

11. The apparatus of claim 10, the processing circuitry further to perform operations that:

retrieve information for the first device instance from the secure directory; and perform secure communications with the first device instance based on the retrieved information from the secure directory;

wherein the secure directory is distributed among a plurality of devices of the first network framework.

12. The apparatus of claim 9, the processing circuitry further to perform operations that:

receive, from the first device instance, an indication of availability for onboarding for the first device instance; and receive, from the first device instance, at least one attribute of the first device instance;

wherein the operations to activate the first device instance onto the first network framework are performed in response to evaluation of the at least one attribute and the indication of the availability for onboarding for the first device instance.

13. The apparatus of claim 9, the processing circuitry further to perform operations that:

establish a secure session with the first device instance via the first network framework; and receive, in the secure session, a physical device identifier, wherein the physical device identifier is unique to the device that hosts the first device instance and the second device instance;

wherein the provisioning of the first device instance and the second device instance is further based on the physical device identifier.

14. The apparatus of claim 9, the processing circuitry to perform further operations that:

receive a unique temporary device identifier from the first device instance, the first device instance indicating availability of the first device instance for onboarding onto the first network framework;

wherein the temporary device identifier and an indication of the availability for onboarding is published by the first device instance in an unsecure communication via the first network framework.

15. The apparatus of claim 14, wherein the temporary device identifier is a non-repeating value generated by the first device instance.

16. The apparatus of claim 9, wherein the operations are initiated by an onboarding tool executed by the processing circuitry of the apparatus, the onboarding tool operating to manage onboarding and provisioning operations for a plurality of devices in multiple network frameworks.

17. At least one non-transitory machine-readable storage medium, comprising a plurality of instructions adapted for facilitating network discovery and onboarding, wherein the instructions, responsive to being executed with processor circuitry of an apparatus, cause the processor circuitry to perform operations that:

activate a first device instance for communication in a first network framework, the first device instance being provided from a device that hosts the first device instance;

associate a first secure device identifier with the first device instance, for identification of the first device instance in the first network framework;

activate a second device instance for communication in a second network framework, the second device instance being provided from the device, the device hosting the second device instance in addition to the first device instance;

associate a second secure device identifier with the second device instance, for identification of the second device instance in the second network framework; and cause provisioning of the second device instance for operation in the second network framework, wherein the second device instance is provisioned in a secure directory based on the second secure device identifier.

18. The machine-readable storage medium of claim 17, wherein the instructions further cause the processor circuitry to perform operations that:

cause provisioning of the first device instance for operation in the first network framework, wherein the first device instance is provisioned in the secure directory based on the first secure device identifier.

19. The machine-readable storage medium of claim 18, wherein the instructions further cause the processor circuitry to perform operations that:

retrieve information for the first device instance from the secure directory; and perform secure communications with the first device instance based on the retrieved information from the secure directory;

wherein the secure directory is distributed among a plurality of devices of the first network framework.

20. The machine-readable storage medium of claim 17, wherein the instructions further cause the processor circuitry to perform operations that:

receive, from the first device instance, an indication of availability for onboarding for the first device instance; and receive, from the first device instance, at least one attribute of the first device instance;

wherein the operations to activate the first device instance onto the first network framework are performed in response to evaluation of the at least one attribute and the indication of the availability for onboarding for the first device instance.

21. The machine-readable storage medium of claim 17, wherein the instructions further cause the processor circuitry to perform operations that:

establish a secure session with the first device instance via the first network framework; and receive, in the secure session, a physical device identifier, wherein the physical device identifier is unique to the device that hosts the first device instance and the second device instance;

wherein the provisioning of the first device instance and the second device instance is further based on the physical device identifier.

22. The machine-readable storage medium of claim 17, wherein the instructions further cause the processor circuitry to perform operations that:
  receive a unique temporary device identifier from the first device instance, the first device instance indicating availability of the first device instance for onboarding onto the first network framework;
  wherein the temporary device identifier and an indication of the availability for onboarding is published by the first device instance in an unsecure communication via the first network framework.

23. The machine-readable storage medium of claim 22, wherein the temporary device identifier is a non-repeating value generated by the first device instance.

24. The machine-readable storage medium of claim 17, wherein the operations are initiated by an onboarding tool executed by the processor circuitry of the apparatus, the onboarding tool operating to manage onboarding and provisioning operations for a plurality of devices in multiple network frameworks.

* * * * *